（12) United States Patent
Pezeshki et al.

(10) Patent No.: US 12,323,984 B2
(45) Date of Patent: Jun. 3, 2025

(54) SUB-BAND INTERFERENCE LEVEL INDICATION USING PHYSICAL UPLINK CONTROL CHANNEL COMMUNICATION

(71) Applicant: QUALCOMM Incorporated, San Diego, CA (US)

(72) Inventors: Hamed Pezeshki, San Diego, CA (US); Tao Luo, San Diego, CA (US); Yan Zhou, San Diego, CA (US); Xiaoxia Zhang, San Diego, CA (US); Arumugam Chendamarai Kannan, San Diego, CA (US); Jing Sun, San Diego, CA (US); Konstantinos Dimou, New York City, NY (US)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 17/759,671

(22) PCT Filed: Mar. 19, 2021

(86) PCT No.: PCT/US2021/070292
§ 371 (c)(1),
(2) Date: Jul. 28, 2022

(87) PCT Pub. No.: WO2021/195655
PCT Pub. Date: Sep. 30, 2021

(65) Prior Publication Data
US 2024/0015745 A1 Jan. 11, 2024

(30) Foreign Application Priority Data
Mar. 23, 2020 (GR) .............................. 20200100153

(51) Int. Cl.
*H04W 72/21* (2023.01)
*H04L 5/00* (2006.01)

(52) U.S. Cl.
CPC ........... *H04W 72/21* (2023.01); *H04L 5/0096* (2013.01)

(58) Field of Classification Search
CPC ............................. H04W 72/21; H04L 5/0096
See application file for complete search history.

(56) References Cited

U.S. PATENT DOCUMENTS

| 8,989,169 B2 | 3/2015 | Kwon et al. |
| 2019/0230549 A1 | 7/2019 | Wang et al. |

(Continued)

FOREIGN PATENT DOCUMENTS

| CN | 101785220 A | 7/2010 |
| CN | 107734566 A | 2/2018 |
| EP | 3592024 A1 | 1/2020 |

OTHER PUBLICATIONS

International Search Report and Written Opinion—PCT/US2021/070292—ISA/EPO—Sep. 1, 2021.

(Continued)

*Primary Examiner* — Natasha W Cosme
(74) *Attorney, Agent, or Firm* — Harrity & Harrity, LLP

(57) ABSTRACT

Various aspects of the present disclosure generally relate to wireless communication. In some aspects, a user equipment may receive, from a base station (BS), a channel state information reference signal (CSI-RS) communication; and transmit, to the BS, a physical uplink control channel communication including feedback information that is a response to the CSI-RS communication and including an interference measurement. Numerous other aspects are provided.

26 Claims, 8 Drawing Sheets

(56) References Cited

U.S. PATENT DOCUMENTS

2019/0363843 A1   11/2019  Gordaychik
2020/0084759 A1    3/2020  Liu et al.

OTHER PUBLICATIONS

Partial International Search Report—PCT/US2021/070292—ISA/EPO—Jun. 8, 2021.

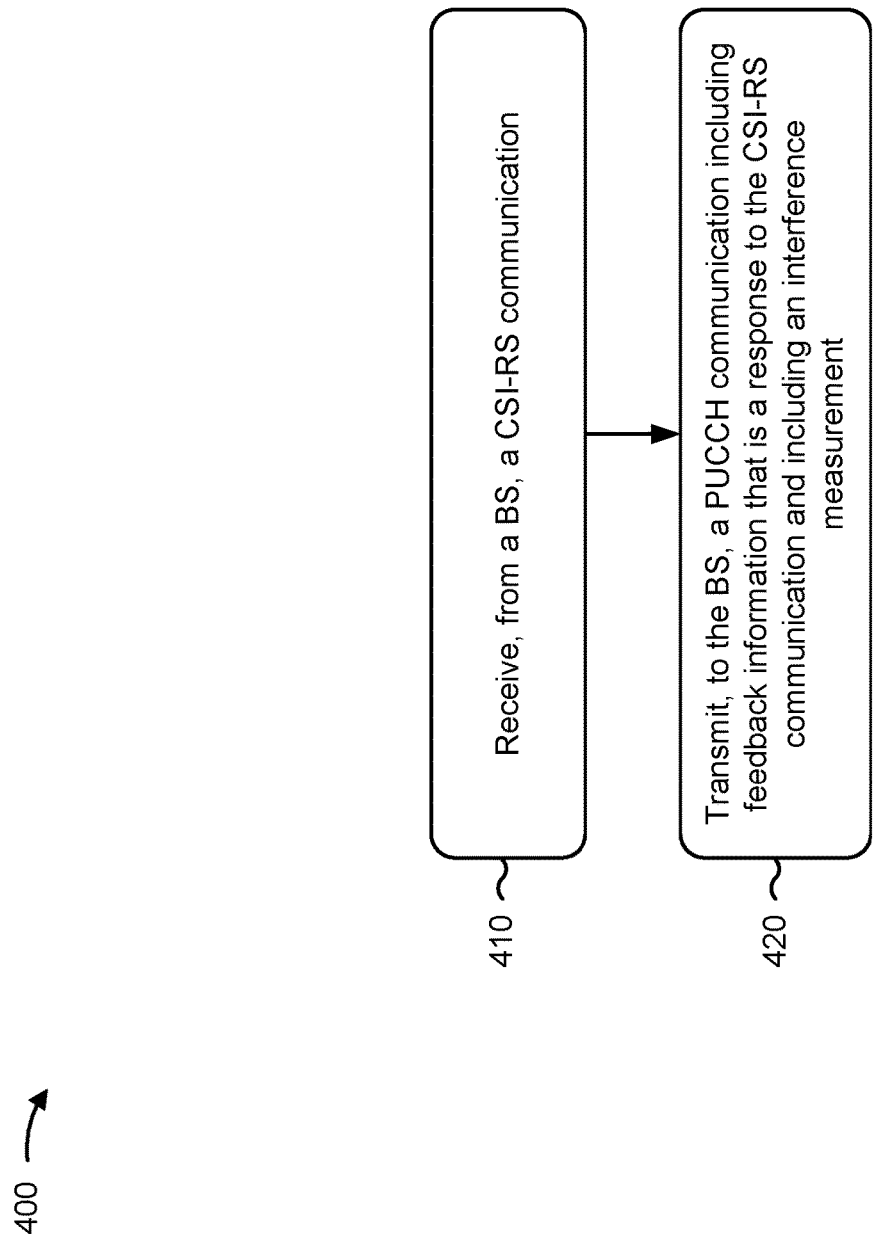

SUB-BAND INTERFERENCE LEVEL INDICATION USING PHYSICAL UPLINK CONTROL CHANNEL COMMUNICATION

CROSS-REFERENCE TO RELATED APPLICATIONS

This Patent Application is a 371 National Phase of Patent Cooperation Treaty (PCT) Patent Application No. PCT/US2021/070292, filed on Mar. 19, 2021, entitled "SUB-BAND INTERFERENCE LEVEL INDICATION USING PHYSICAL UPLINK CONTROL CHANNEL COMMUNICATION," and claims priority to Greek patent application No. 20200100153, filed on Mar. 23, 2020, entitled "SUB-BAND INTERFERENCE LEVEL INDICATION USING PHYSICAL UPLINK CONTROL CHANNEL (PUCCH) COMMUNICATION," and assigned to the assignee hereof. The disclosure of the prior Applications are considered part of and are incorporated by reference in this Patent Application.

FIELD OF THE DISCLOSURE

Aspects of the present disclosure generally relate to wireless communication and to techniques and apparatuses for sub-band interference level indication using a physical uplink control channel (PUCCH) communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include receiving, from a base station (BS), a channel state information reference signal (CSI-RS) communication; and transmitting, to the BS, a physical uplink control channel (PUCCH) communication including feedback information that is a response to the CSI-RS communication and including an interference measurement.

In some aspects, a method of wireless communication, performed by a BS, may include transmitting, to a UE, a CSI-RS communication; and receiving, from the UE, a PUCCH communication including feedback information that is a response to the CSI-RS communication and including an interference measurement.

In some aspects, a UE for wireless communication may include a memory and one or more processors operatively coupled to the memory. The memory and the one or more processors may be configured to receive, from a BS, a CSI-RS communication; and transmit, to the BS, a PUCCH communication including feedback information that is a response to the CSI-RS communication and including an interference measurement.

In some aspects, a BS for wireless communication may include a memory and one or more processors operatively coupled to the memory. The memory and the one or more processors may be configured to transmit, to a UE, a CSI-RS communication; and receive, from the UE, a PUCCH communication including feedback information that is a response to the CSI-RS communication and including an interference measurement.

In some aspects, a non-transitory computer-readable medium may store one or more instructions for wireless communication. The one or more instructions, when executed by one or more processors of a UE, may cause the one or more processors to receive, from a BS, a CSI-RS communication; and transmit, to the BS, a PUCCH communication including feedback information that is a response to the CSI-RS communication and including an interference measurement.

In some aspects, a non-transitory computer-readable medium may store one or more instructions for wireless communication. The one or more instructions, when executed by one or more processors of a BS, may cause the one or more processors to transmit, to a UE, a CSI-RS communication; and receive, from the UE, a PUCCH communication including feedback information that is a response to the CSI-RS communication and including an interference measurement.

In some aspects, an apparatus for wireless communication may include means for receiving, from a BS, a CSI-RS communication; and means for transmitting, to the BS, a PUCCH communication including feedback information that is a response to the CSI-RS communication and including an interference measurement.

In some aspects, an apparatus for wireless communication may include means for transmitting, to a UE, a CSI-RS communication; and means for receiving, from the UE, a PUCCH communication including feedback information that is a response to the CSI-RS communication and including an interference measurement.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 4-5 are diagrams illustrating example processes associated with sub-band interference level indication using PUCCH communication, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
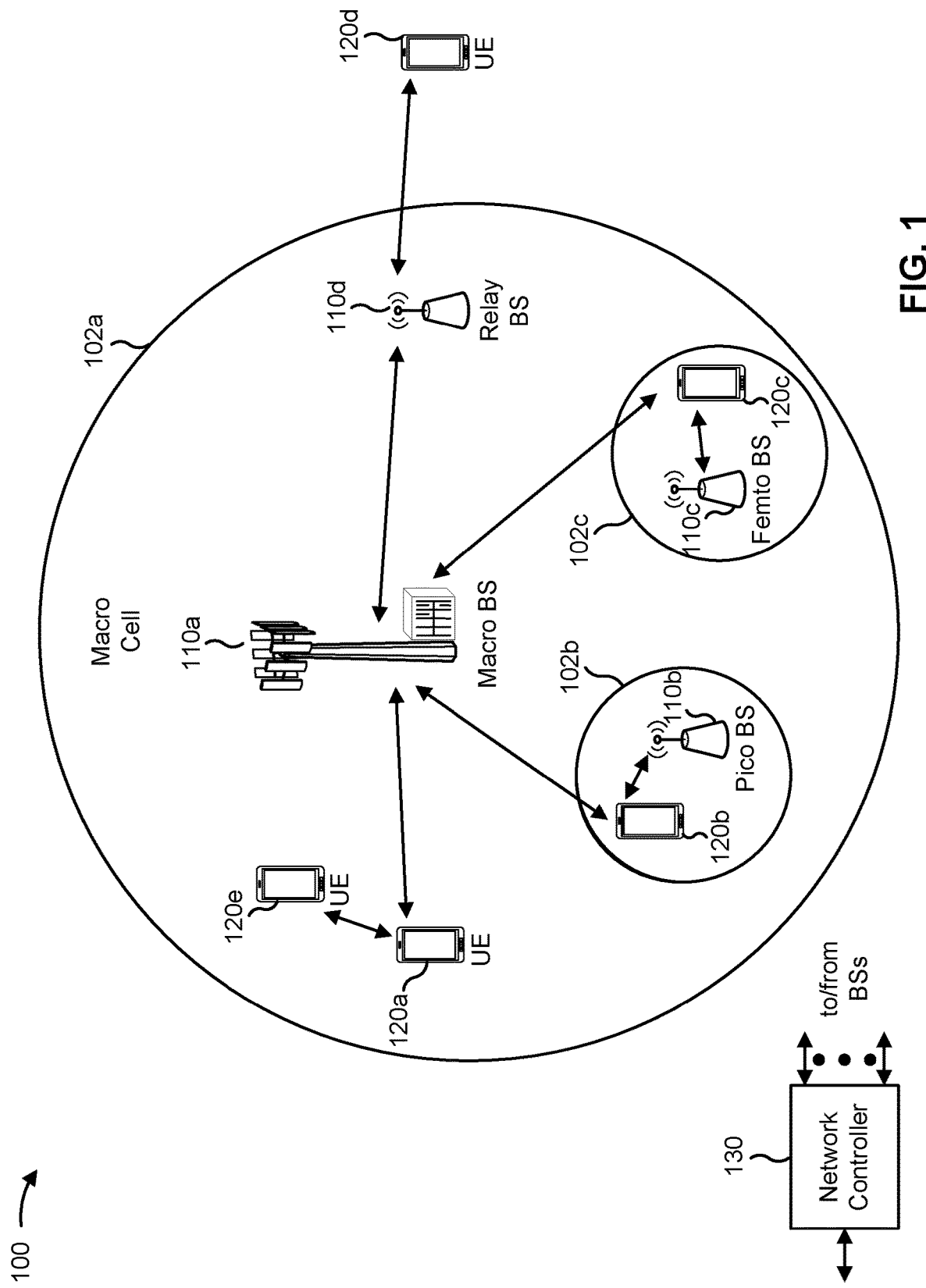
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS)

is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
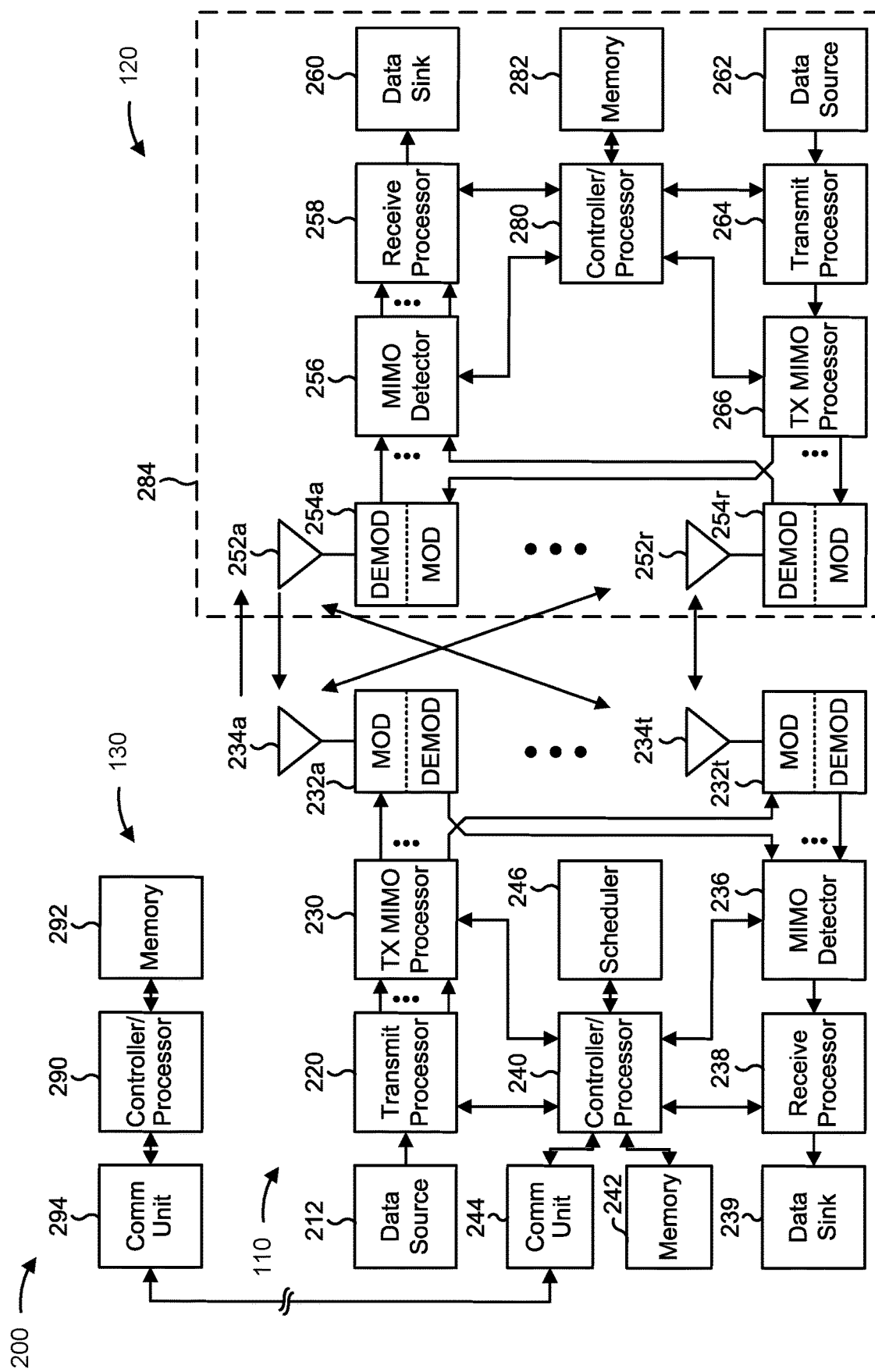
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3A-5.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3A-5.

Controller/processor 240 of base station 110, controller/processor 280 of UE 120, and/or any other component(s) of FIG. 2 may perform one or more techniques associated with sub-band interference level indication using physical uplink control channel (PUCCH) communication, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some aspects, executing instructions may include running the instructions, converting the instructions, compiling the instructions, and/or interpreting the instructions, among other examples.

In some aspects, a UE includes means for receiving, from a BS, a channel state information reference signal (CSI-RS) communication; or means for transmitting, to the BS, a PUCCH communication including feedback information that is a response to the CSI-RS communication and including an interference measurement. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for receiving, based at least in part on transmitting the PUCCH communication, information identifying a change to a semi-persistent scheduling occasion or a re-transmission sub-band.

In some aspects, the UE includes means for further comprising: means for switching, based at least in part on transmitting the PUCCH communication, from the first sub-band to a second sub-band; or means for transmitting, using the second sub-band, one or more sounding reference signal communications.

In some aspects, the UE includes means for monitoring for a physical downlink shared channel (PDSCH) transmission in a particular sub-band; means for determining a failure of the PDSCH transmission in the particular sub-band based at least in part on monitoring for the PDSCH transmission; or means for transmitting the PUCCH communication in the particular sub-band.

In some aspects, the UE includes means for further comprising: means for switching, based at least in part on transmitting the PUCCH communication, from the first sub-band to a second sub-band; or means for transmitting, using the second sub-band, the PUCCH communication.

In some aspects, a BS includes means for transmitting, to a UE, a CSI-RS communication; or means for receiving, from the UE, a PUCCH) communication including feedback information that is a response to the CSI-RS communication and including an interference measurement. The means for the BS to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the BS includes means for transmitting, based at least in part on the interference measurement, information identifying a change to a semi-persistent scheduling occasion or a re-transmission sub-band.

In some aspects, the BS includes means for further comprising: means for receiving, using a second sub-band of the plurality of sub-bands, one or more sounding reference signal communications from the UE.

In some aspects, the BS includes means for transmitting for a PDSCH transmission in a particular sub-band; or means for receiving the PUCCH communication in the particular sub-band.

In some aspects, the BS includes means for identifying, based at least in part on a PUCCH sequence of the PUCCH communication, an interference level of a sub-band on which the CSI-RS communication is transmitted.

In some aspects, the BS includes means for determining an interference level of a first sub-band, of a plurality of sub-bands, on which the CSI-RS is transmitted based at least in part on a second sub-band, of the plurality of sub-bands, on which the PUCCH communication is received.

In some aspects, the BS includes means for receiving, using a second sub-band of the plurality of sub-bands, the PUCCH communication.

As indicated above, FIG. 2 is provided as an example. Other examples may differ from what is described with regard to FIG. 2.

In a wireless network, a BS and a UE may communicate via an access link, which may include an uplink and a downlink. In some cases, the bandwidth of the uplink and/or the downlink may span across a plurality of sub-bands, such as where multi-panel frequency division multiplexing (FDM) and analog beamforming-based multi-user multiple input multiple output (MU-MIMO) are deployed. Given the complexity of such deployments in an industrial Internet of things (IoT) setting and/or in other settings, UEs may have tight latency requirements.

As a result, it may be difficult for the UE to report interference in the plurality of sub-bands. For example, the BS may dynamically and explicitly instruct the UE via downlink control information (DCI) to enable beam sweeping in the plurality of sub-bands for purposes of interference measurement. The BS may use an interference report for updating a semi-persistent scheduling (SPS) occasion. However, a latency of the interference measurements may increase to a level that does not meet latency requirements of industrial IoT settings and/or other settings that have tight latency requirements.

Some aspects described herein provide techniques and apparatuses for indicating a sub-band interference level using PUCCH communication. For example, after a failed PDSCH communication, a UE may receive a CSI-RS communication and perform an interference measurement on one or more beams conveying the CSI-RS communication. In this case, the UE may transmit, in a PUCCH communication, a feedback message (e.g., a hybrid automatic repeat request (HARQ) negative acknowledgement (NACK)) for the PDSCH communication and may include information identifying the interference measurement with the feedback message. In some aspects, the UE may transmit the PUCCH and/or a sounding reference signal (SRS) for beam estimation in the same sub-band in which the PDSCH communication is attempted, or in a different sub-band. Based at least in part on the interference measurement and/or the SRS, the BS may determine which sub-band to use to transmit a retransmission of the PDSCH.

In this way, the BS may receive the SRSs with a reduced latency and may identify an interference level in one or more sub-bands based at least in part on the SRSs. This may enable the BS to schedule the retransmission of the PDSCH and/or reconfigure an SPS occasion with reduced delay relative to waiting for a DCI-scheduled interference measurement report. Based at least in part on reducing the delay for reporting interference, the UE and the BS may enable increased latency requirements of some UE use cases.

Figure 3A:
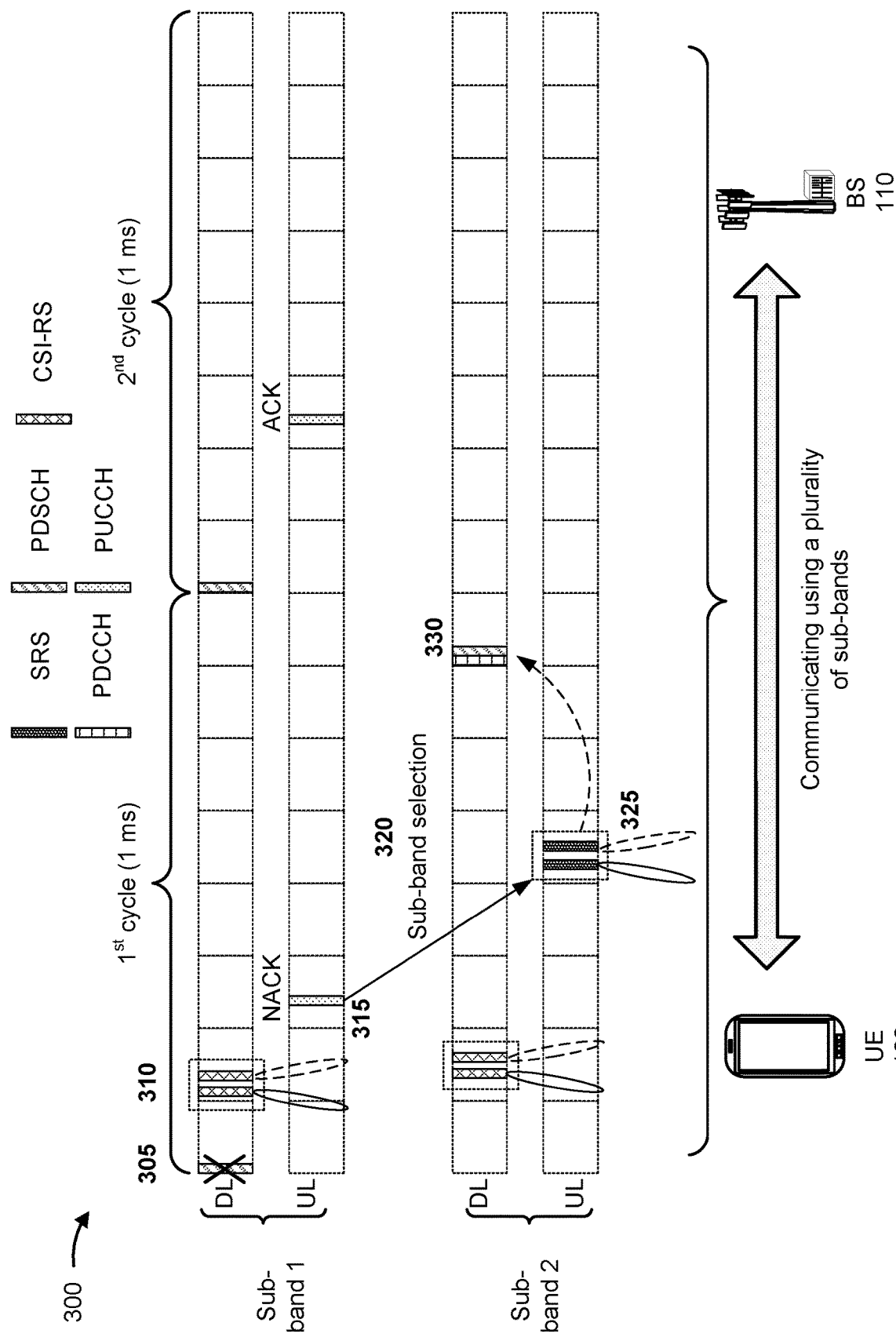
FIGS. 3A-3B are diagrams illustrating an example associated with sub-band interference level indication using physical uplink control channel (PUCCH) communication, in accordance with the present disclosure.
Figure 3B:
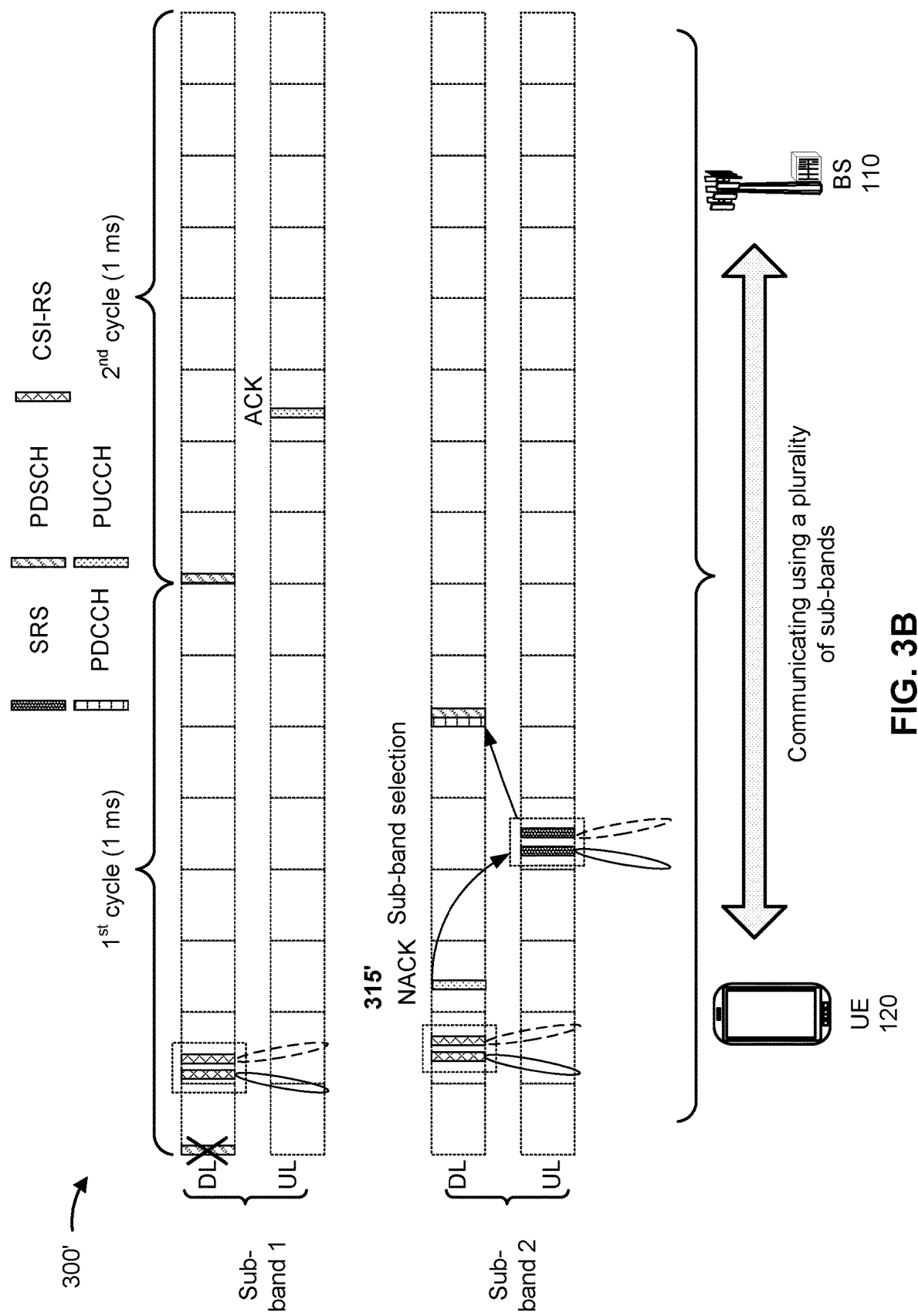

FIGS. 3A and 3B are diagrams illustrating examples 300/300' of sub-band interference level indication using PUCCH communication, in accordance with various aspects of the present disclosure. As shown in FIGS. 3A and 3B, examples 300/300' include a BS 110 and a UE 120.

As further shown in FIG. 3A, and by reference number 305, BS 110 may attempt to transmit a PDSCH communication to UE 120. For example, BS 110 may attempt to transmit data using the PDSCH communication. In some aspects, BS 110 may transmit the PDSCH communication using a particular sub-band. For example, BS 110 may transmit the PDSCH communication in the first sub-band. In this case, UE 120 may fail to receive the PDSCH communication, such as based at least in part on a threshold amount of interference on the first sub-band.

As shown by reference number 310, after attempting to transmit the PDSCH to UE 120, BS 110 may transmit a CSI-RS to enable an interference measurement. For example, BS 110 may transmit the CSI-RS on a first sub-band, a second sub-band, and/or the like. In this case, UE 120 may perform an interference measurement (e.g., a CSI interference measurement) of one or more beams conveying the CSI-RS on the first sub-band, the second sub-band, and/or the like. In some aspects, the interference measurement is an signal to interference and noise ratio (SINR) measurement a signal to noise ratio (SNR) measurement, among other examples. For example, UE 120 may determine, for each sub-band of a set of sub-bands, an SINR measurement, and may report the per-sub-band SINR measurements to BS 110.

As shown by reference number 315, based at least in part on performing one or more interference measurements of one or more beams on one or more sub-bands, UE 120 may transmit a PUCCH communication that includes a feedback message and a report of the one or more interference measurements. For example, UE 120 may transmit a NACK message in a pre-configured PUCCH resource, to indicate a failure of the PDSCH and an indication of the one or more interference measurements of the one or more beams on the one or more sub-bands. In some aspects, UE 120 may transmit a PUCCH communication with a particular format. For example, when the PUCCH communication includes HARQ content (e.g., a NACK) only (e.g., the interference measurement is implicitly indicated as described below), UE 120 may use HARQ format A. Alternatively, when the PUCCH communication includes HARQ content and an interference measurement identifier (e.g., the interference measurement is explicitly indicated), UE 120 may use HARQ format B. For example, UE 120 may use HARQ format B, which may include a CSI-RS or CSI interference measurement (CSI-IM) measurement report performed on a pre-configured CSI resource. In some aspects, UE 120 may autonomously perform a CSI-IM measurement and report the CSI-IM resources on which the CSI-IM measurement is performed.

In some aspects, UE 120 may indicate a switch from the first sub-band to a second sub-band using the PUCCH, as shown by reference number 320. For example, respective interference levels of the first sub-band and the second sub-band, identified in the PUCCH communication, may implicitly indicate that UE 120 is to switch to the second sub-band. In this case, UE 120 and BS 110 may switch to using the second sub-band for communication based at least in part on the respective interference levels. Additionally, or alternatively, UE 120 may include an explicit sub-band switch indication in the PUCCH communication.

In some aspects, UE 120 may transmit the PUCCH communication in the same sub-band to which the feedback message is related. For example, to indicate a NACK for a PDSCH communication in the first sub-band, UE 120 may transmit the PUCCH communication in the first sub-band. Additionally, or alternatively, as shown in FIG. 3B, and by reference number 315', UE 120 may switch to the second sub-band to transmit the PUCCH communication. For example, based at least in part on an interference level of the second sub-band being less than an interference level of the first sub-band, UE 120 may switch to the second sub-band to transmit the PUCCH communication.

In some aspects, UE 120 may include an explicit indicator of an interference level in the PUCCH communication. For example, the PUCCH communication may include an information element with a value identifying an interference level of the first sub-band, the second sub-band, and/or the like. Additionally, or alternatively, UE 120 may use a PUCCH sequence to identify an interference value. For example, UE 120 may select a PUCCH sequence for the PUCCH communication from a plurality of available PUCCH sequences that each correspond to a different interference level. In this case, based at least in part on identifying the PUCCH sequence, BS 110 may determine the interference level, update an SPS occasion, determine a sub-band for a retransmission of the PDSCH communication, and/or the like.

As further shown in FIG. 3A, and by reference number 325, based at least in part on transmitting the PUCCH communication, UE 120 may transmit an SRS communication to enable beam estimation from a set of beams on the second sub-band. In this case, as shown by reference number 330, based at least in part on receiving the SRS communication, BS 110 may transmit a physical downlink control channel (PDCCH) and a retransmission of the PDSCH. For example, BS 110 may transmit the PDCCH on the first sub-band, the second sub-band, and/or the like. In this way, BS 110 uses an interference measurement in a PUCCH communication to enable PDSCH retransmission with reduced latency relative to using a DCI-scheduled interference measurement report.

As indicated above, FIGS. 3A and 3B are provided as examples. Other examples may differ from what is described with respect to FIGS. 3A and 3B.

FIG. 4 is a diagram illustrating an example process 400 performed, for example, by a UE, in accordance with various aspects of the present disclosure. Example process 400 is an example where the UE (e.g., UE 120 and/or the like) performs operations associated with sub-band interference level indication using PUCCH communication.

As shown in FIG. 4, in some aspects, process 400 may include receiving, from a BS, a CSI-RS communication (block 410). For example, the UE (e.g., using receive processor 258, transmit processor 264, controller/processor 280, memory 282, and/or the like) may receive, from a BS, a CSI-RS communication, as described above.

As further shown in FIG. 4, in some aspects, process 400 may include transmitting, to the BS, a PUCCH communication including feedback information that is a response to the CSI-RS communication and including an interference measurement (block 420). For example, the UE (e.g., using receive processor 258, transmit processor 264, controller/processor 280, memory 282, and/or the like) may transmit, to the BS, a PUCCH communication including feedback information that is a response to the CSI-RS communication and including an interference measurement, as described above.

Process 400 may include additional aspects, such as any single aspect or any combination of aspects described below and/or in connection with one or more other processes described elsewhere herein.

In a first aspect, the interference measurement is based at least in part on at least one of the CSI-RS communication or an interference measurement resource.

In a second aspect, alone or in combination with the first aspect, process 400 includes receiving, based at least in part on transmitting the PUCCH communication, information identifying a change to a semi-persistent scheduling occasion or a re-transmission sub-band.

In a third aspect, alone or in combination with one or more of the first and second aspects, the CSI-RS communication is received and the PUCCH communication is transmitted on a first sub-band, of a plurality of sub-bands, and process 400 further comprises: switching, based at least in part on transmitting the PUCCH communication, from the first sub-band to a second sub-band, and transmitting, using the second sub-band, one or more sounding reference signal communications.

In a fourth aspect, alone or in combination with one or more of the first through third aspects, the PUCCH communication includes an indication of the second sub-band.

In a fifth aspect, alone or in combination with one or more of the first through fourth aspects, the feedback information is a hybrid automatic repeat request feedback message.

In a sixth aspect, alone or in combination with one or more of the first through fifth aspects, process 400 includes monitoring for a PDSCH transmission in a particular sub-band and determining a failure of the PDSCH transmission in the particular sub-band based at least in part on monitoring for the PDSCH transmission, and transmitting the PUCCH communication includes transmitting the PUCCH communication in the particular sub-band.

In a seventh aspect, alone or in combination with one or more of the first through sixth aspects, a PUCCH sequence of the PUCCH communication identifies an interference level.

In an eighth aspect, alone or in combination with one or more of the first through seventh aspects, the interference measurement is identified in information of a payload of the PUCCH communication.

In a ninth aspect, alone or in combination with one or more of the first through eighth aspects, resources for transmission of the PUCCH communication are configured on a plurality of sub-bands, and a particular sub-band, of the plurality of sub-bands, on which the PUCCH communication is conveyed corresponds to an interference level of the plurality of sub-bands.

In a tenth aspect, alone or in combination with one or more of the first through ninth aspects, the CSI-RS communication is received on a first sub-band, of a plurality of sub-bands, and process 400 further comprises: switching, based at least in part on transmitting the PUCCH communication, from the first sub-band to a second sub-band, and transmitting the PUCCH communication comprises transmitting, using the second sub-band, the PUCCH communication.

In an eleventh aspect, alone or in combination with one or more of the first through tenth aspects, the interference measurement is a CSI interference measurement.

In a twelfth aspect, alone or in combination with one or more of the first through eleventh aspects, the PUCCH communication is a PUCCH format A or a PUCCH format B, and a PUCCH format of the PUCCH communication is based at least in part on a content of the PUCCH communication.

In a thirteenth aspect, alone or in combination with one or more of the first through twelfth aspects, the interference measurement is a signal to interference and noise ratio measurement on a per-sub-band basis.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
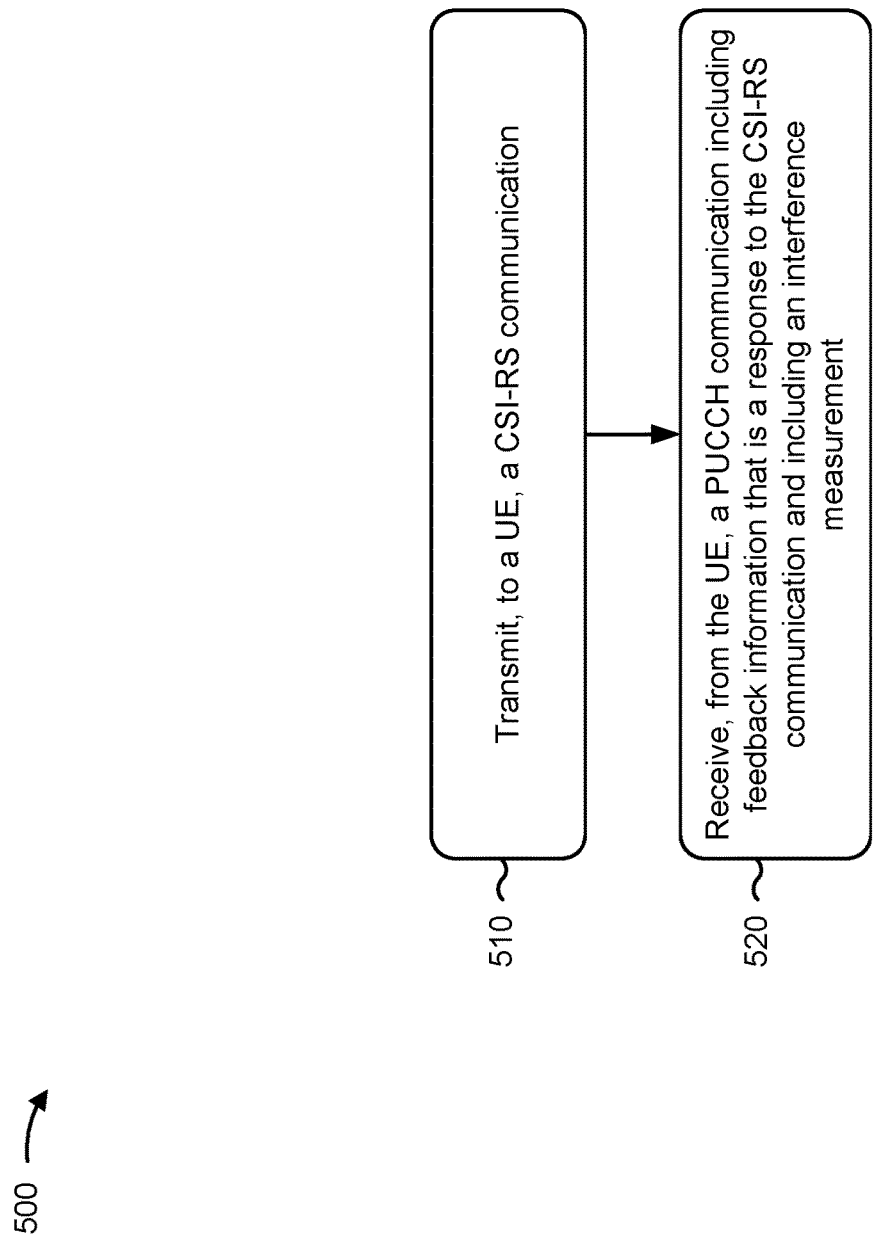

FIG. 5 is a diagram illustrating an example process 500 performed, for example, by a BS, in accordance with various aspects of the present disclosure. Example process 500 is an example where the BS (e.g., BS 110 and/or the like) performs operations associated with sub-band interference level indication using PUCCH communication.

As shown in FIG. 5, in some aspects, process 500 may include transmitting, to a UE, a CSI-RS communication (block 510). For example, the BS (e.g., using transmit processor 220, receive processor 238, controller/processor 240, memory 242, and/or the like) may transmit, to a UE a CSI-RS communication, as described above.

As further shown in FIG. 5, in some aspects, process 500 may include receiving, from the UE, a PUCCH communication including feedback information that is a response to the CSI-RS communication and including an interference measurement (block 520). For example, the BS (e.g., using transmit processor 220, receive processor 238, controller/processor 240, memory 242, and/or the like) may receive, from the UE, a PUCCH communication including feedback information that is a response to the CSI-RS communication and including an interference measurement, as described above.

Process 500 may include additional aspects, such as any single aspect or any combination of aspects described below and/or in connection with one or more other processes described elsewhere herein.

In a first aspect, the interference measurement is based at least in part on at least one of the CSI-RS communication or an interference measurement resource.

In a second aspect, alone or in combination with the first aspect, process 500 includes transmitting, based at least in part on the interference measurement, information identifying a change to a semi-persistent scheduling occasion or a re-transmission sub-band.

In a third aspect, alone or in combination with one or more of the first and second aspects, the CSI-RS communication is transmitted and the PUCCH communication is received on a first sub-band, of a plurality of sub-bands, and process 500 further comprises: receiving, using a second sub-band of the plurality of sub-bands, one or more sounding reference signal communications from the UE.

In a fourth aspect, alone or in combination with one or more of the first through third aspects, the PUCCH communication includes an indication of the second sub-band.

In a fifth aspect, alone or in combination with one or more of the first through fourth aspects, the feedback information is a hybrid automatic repeat request feedback message.

In a sixth aspect, alone or in combination with one or more of the first through fifth aspects, receiving the PUCCH communication comprises receiving the PUCCH communication in the particular sub-band.

In a seventh aspect, alone or in combination with one or more of the first through sixth aspects, process 500 includes identifying, based at least in part on a PUCCH sequence of the PUCCH communication, an interference level of a sub-band on which the CSI-RS communication is transmitted.

In an eighth aspect, alone or in combination with one or more of the first through seventh aspects, the interference measurement is included in information of a payload of the PUCCH communication.

In a ninth aspect, alone or in combination with one or more of the first through eighth aspects, process 500 includes determining an interference level of a first sub-band, of the plurality of sub-bands, on which the CSI-RS is transmitted based at least in part on a second sub-band, of the plurality of sub-bands, on which the PUCCH communication is received.

In a tenth aspect, alone or in combination with one or more of the first through ninth aspects, the CSI-RS communication is transmitted on a first sub-band, of a plurality of sub-bands, and receiving the PUCCH communication comprises: receiving, using a second sub-band of the plurality of sub-bands, the PUCCH communication.

In an eleventh aspect, alone or in combination with one or more of the first through tenth aspects, the interference measurement is a CSI interference measurement.

In a twelfth aspect, alone or in combination with one or more of the first through eleventh aspects, the PUCCH communication is a PUCCH format A or a PUCCH format B, and a PUCCH format of the PUCCH communication is based at least in part on a content of the PUCCH communication.

In a thirteenth aspect, alone or in combination with one or more of the first through twelfth aspects, the interference measurement is a signal to interference and noise ratio measurement on a per-sub-band basis.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
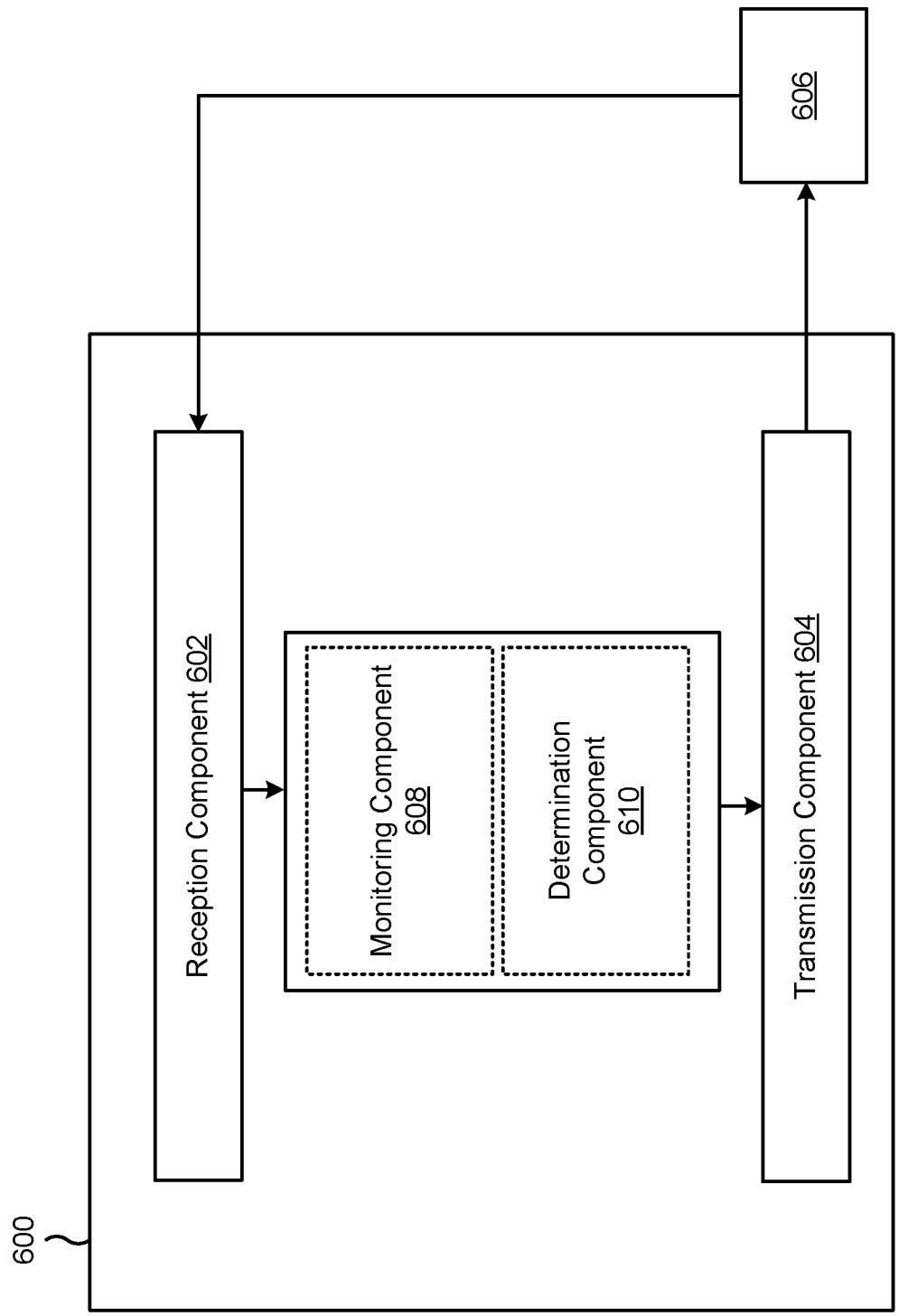
FIGS. 6-7 are block diagrams of example apparatuses for wireless communication, in accordance with the present disclosure.

FIG. 6 is a block diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include one or more of a monitoring component 608 or a determination component 610, among other examples.

In some aspects, the apparatus 600 may be configured to perform one or more operations described herein in connection with FIGS. 3A-3B. Additionally, or alternatively, the apparatus 600 may be configured to perform one or more processes described herein, such as process 400 of FIG. 4. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be co-located with the reception component 602 in a transceiver.

The reception component 602 may receive, from a BS, a CSI-RS communication. The transmission component 604 may transmit, to the BS, a PUCCH communication including feedback information that is a response to the CSI-RS communication and including an interference measurement.

The reception component 602 may receive, based at least in part on transmitting the PUCCH communication, information identifying a change to a semi-persistent scheduling occasion or a re-transmission sub-band.

The monitoring component 608 may monitor for a PDSCH transmission in a particular sub-band.

The determination component 610 may determine a failure of the PDSCH transmission in the particular sub-band based at least in part on monitoring for the PDSCH transmission.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
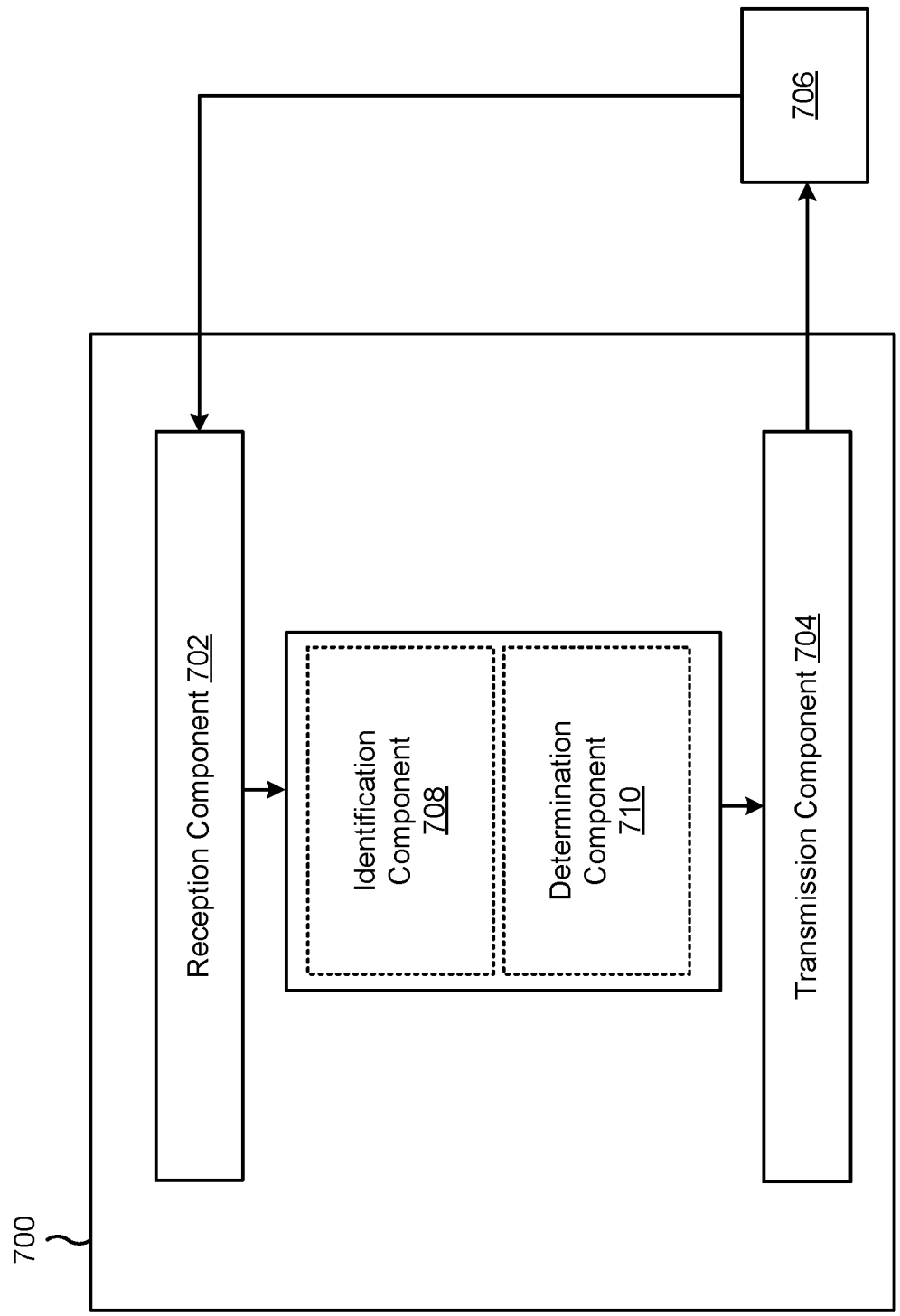

FIG. 7 is a block diagram of an example apparatus 700 for wireless communication. The apparatus 700 may be a BS, or a BS may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of an identification component 708 or the determination component 710, among other examples.

In some aspects, the apparatus 700 may be configured to perform one or more operations described herein in connection with FIGS. 3A-3B. Additionally, or alternatively, the apparatus 700 may be configured to perform one or more processes described herein, such as process 500 of FIG. 5 or a combination thereof. In some aspects, the apparatus 700 and/or one or more components shown in FIG. 7 may include one or more components of the BS described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the BS described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the BS described above in connection with FIG. 2. In some aspects, the transmission component 704 may be co-located with the reception component 702 in a transceiver.

The transmission component 704 may transmit, to a UE, a CSI-RS communication. The reception component 702 may receive, from the UE, a PUCCH communication including feedback information that is a response to the CSI-RS communication and including an interference measurement.

The transmission component 704 may transmit, based at least in part on the interference measurement, information identifying a change to a semi-persistent scheduling occasion or a re-transmission sub-band.

The transmission component 704 may transmit for a PDSCH transmission in a particular sub-band.

The identification component 708 may identify, based at least in part on a PUCCH sequence of the PUCCH communication, an interference level of a sub-band on which the CSI-RS communication is transmitted.

The determination component 710 may determine an interference level of a first sub-band, of a plurality of sub-bands, on which the CSI-RS is transmitted based at least in part on a second sub-band, of the plurality of sub-bands, on which the PUCCH communication is received.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: receiving, from a base station (BS), a channel state information reference signal (CSI-RS) communication; and transmitting, to the BS, a physical uplink control channel (PUCCH) communication including feedback information that is a response to the CSI-RS communication and including an interference measurement.

Aspect 2: The method of Aspect 1, wherein the interference measurement is based at least in part on at least one of the CSI-RS communication or an interference measurement resource.

Aspect 3: The method of any of Aspects 1 to 2, further comprising: receiving, based at least in part on transmitting the PUCCH communication, information identifying a change to a semi-persistent scheduling occasion or a re-transmission sub-band.

Aspect 4: The method of any of Aspects 1 to 3, wherein the CSI-RS communication is received and the PUCCH communication is transmitted on a first sub-band, of a plurality of sub-bands, and further comprising: switching, based at least in part on transmitting the PUCCH communication, from the first sub-band to a second sub-band; and transmitting, using the second sub-band, one or more sounding reference signal communications.

Aspect 5: The method of Aspect 4, wherein the PUCCH communication includes an indication of the second sub-band.

Aspect 6: The method of any of Aspects 1 to 5, wherein the feedback information is a hybrid automatic repeat request feedback message.

Aspect 7: The method of any of Aspects 1 to 6, further comprising: monitoring for a physical downlink shared channel (PDSCH) transmission in a particular sub-band; determining a failure of the PDSCH transmission in the particular sub-band based at least in part on monitoring for the PDSCH transmission; and wherein transmitting the PUCCH communication comprises: transmitting the PUCCH communication in the particular sub-band, wherein transmitting the PUCCH communication comprises: transmitting the PUCCH communication in the particular sub-band.

Aspect 8: The method of any of Aspects 1 to 7, wherein a PUCCH sequence of the PUCCH communication identifies an interference level.

Aspect 9: The method of any of Aspects 1 to 8, wherein the interference measurement is identified in information of a payload of the PUCCH communication.

Aspect 10: The method of any of Aspects 1 to 9, wherein resources for transmission of the PUCCH communication are configured on a plurality of sub-bands, and wherein a particular sub-band, of the plurality of sub-bands, on which the PUCCH communication is conveyed corresponds to an interference level of the plurality of sub-bands.

Aspect 11: The method of any of Aspects 1 to 10, wherein the CSI-RS communication is received on a first sub-band, of a plurality of sub-bands, and further comprising: switching, based at least in part on transmitting the PUCCH communication, from the first sub-band to a second sub-band; and wherein transmitting the PUCCH communication transmitting, using the second sub-band, the PUCCH communication.

Aspect 12: The method of any of Aspects 1 to 11, wherein the interference measurement is a channel state information (CSI) interference measurement.

Aspect 13: The method of any of Aspects 1 to 12, wherein the PUCCH communication is a PUCCH format A or a PUCCH format B, and wherein a PUCCH format of the PUCCH communication is based at least in part on a content of the PUCCH communication.

Aspect 14: A method of wireless communication performed by a base station (BS), comprising: transmitting, to a user equipment (UE), a channel state information reference signal (CSI-RS) communication; and receiving, from the UE, a physical uplink control channel (PUCCH) communication including feedback information that is a response to the CSI-RS communication and including an interference measurement.

Aspect 15: The method of Aspect 14, wherein the interference measurement is based at least in part on at least one of the CSI-RS communication or an interference measurement resource.

Aspect 16: The method of any of Aspects 14 to 15, further comprising: transmitting, based at least in part on the interference measurement, information identifying a change to a semi-persistent scheduling occasion or a re-transmission sub-band.

Aspect 17: The method of any of Aspects 14 to 16, wherein the CSI-RS communication is transmitted and the PUCCH communication is received on a first sub-band, of a plurality of sub-bands, and further comprising: receiving, using a second sub-band of the plurality of sub-bands, one or more sounding reference signal communications from the UE.

Aspect 18: The method of Aspect 17, wherein the PUCCH communication includes an indication of the second sub-band.

Aspect 19: The method of any of Aspects 14 to 18, wherein the feedback information is a hybrid automatic repeat request feedback message.

Aspect 20: The method of any of Aspects 14 to 19, further comprising: transmitting for a physical downlink shared channel (PDSCH) transmission in a particular sub-band; and wherein receiving the PUCCH communication comprises: receiving the PUCCH communication in the particular sub-band, wherein receiving the PUCCH communication comprises: receiving the PUCCH communication in the particular sub-band.

Aspect 21: The method of any of Aspects 14 to 20, further comprising: identifying, based at least in part on a PUCCH sequence of the PUCCH communication, an interference level of a sub-band on which the CSI-RS communication is transmitted.

Aspect 22: The method of any of Aspects 14 to 21, wherein the interference measurement is included in information of a payload of the PUCCH communication.

Aspect 23: The method of any of Aspects 14 to 22, further comprising: determining an interference level of a first sub-band, of a plurality of sub-bands, on which the CSI-RS is transmitted based at least in part on a second sub-band, of the plurality of sub-bands, on which the PUCCH communication is received.

Aspect 24: The method of any of Aspects 14 to 23, wherein the CSI-RS communication is transmitted on a first sub-band, of a plurality of sub-bands, and wherein receiving the PUCCH communication comprises: receiving, using a second sub-band of the plurality of sub-bands, the PUCCH communication.

Aspect 25: The method of any of Aspects 14 to 24, wherein the interference measurement is a channel state information (CSI) interference measurement.

Aspect 26: The method of any of Aspects 14 to 25, wherein the PUCCH communication is a PUCCH format A or a PUCCH format B, and wherein a PUCCH format of the PUCCH communication is based at least in part on a content of the PUCCH communication.

Aspect 27: An apparatus for wireless communication at a device, comprising a processor; memory coupled with the processor; and instructions stored in the memory and executable by the processor to cause the apparatus to perform the method of one or more of Aspects 1-13.

Aspect 28: A device for wireless communication, comprising a memory and one or more processors coupled to the memory, the memory and the one or more processors configured to perform the method of one or more of Aspects 1-13.

Aspect 29: An apparatus for wireless communication, comprising at least one means for performing the method of one or more of Aspects 1-13.

Aspect 30: A non-transitory computer-readable medium storing code for wireless communication, the code comprising instructions executable by a processor to perform the method of one or more of Aspects 1-13.

Aspect 31: A non-transitory computer-readable medium storing a set of instructions for wireless communication, the set of instructions comprising one or more instructions that, when executed by one or more processors of a device, cause the device to perform the method of one or more of Aspects 1-13.

Aspect 27: An apparatus for wireless communication at a device, comprising a processor; memory coupled with the processor; and instructions stored in the memory and executable by the processor to cause the apparatus to perform the method of one or more of Aspects 14-26.

Aspect 28: A device for wireless communication, comprising a memory and one or more processors coupled to the memory, the memory and the one or more processors configured to perform the method of one or more of Aspects 14-26.

Aspect 29: An apparatus for wireless communication, comprising at least one means for performing the method of one or more of Aspects 14-26.

Aspect 30: A non-transitory computer-readable medium storing code for wireless communication, the code comprising instructions executable by a processor to perform the method of one or more of Aspects 14-26.

Aspect 31: A non-transitory computer-readable medium storing a set of instructions for wireless communication, the set of instructions comprising one or more instructions that, when executed by one or more processors of a device, cause the device to perform the method of one or more of Aspects 14-26.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
 a memory; and
 one or more processors, coupled to the memory, configured to:
 receive, from a base station (BS), a channel state information reference signal (CSI-RS) communication;
 transmit, to the BS, a physical uplink control channel (PUCCH) communication including feedback information that is a response to the CSI-RS communication and including an interference measurement, wherein the PUCCH communication includes an indication of a second sub-band and wherein the CSI-RS communication is received and the PUCCH communication is transmitted on a first sub-band, of a plurality of sub-bands;
switch, based at least in part on transmitting the PUCCH communication, from the first sub-band to the second sub-band; and
transmit, using the second sub-band, one or more sounding reference signal communications.

2. The UE of claim 1, wherein the interference measurement is based at least in part on at least one of the CSI-RS communication or an interference measurement resource.

3. The UE of claim 1, wherein the one or more processors are further configured to:
receive, based at least in part on transmitting the PUCCH communication, information identifying a change to a semi-persistent scheduling occasion or a re-transmission sub-band.

4. The UE of claim 1, wherein the feedback information is a hybrid automatic repeat request feedback message.

5. The UE of claim 1, wherein the one or more processors are further configured to:
monitor for a physical downlink shared channel (PDSCH) transmission in a particular sub-band;
determine a failure of the PDSCH transmission in the particular sub-band based at least in part on monitoring for the PDSCH transmission; and
wherein the one or more processors, to transmit the PUCCH communication, are configured to:
transmit the PUCCH communication in the particular sub-band.

6. The UE of claim 1, wherein a PUCCH sequence of the PUCCH communication identifies an interference level.

7. The UE of claim 1, wherein the interference measurement is identified in information of a payload of the PUCCH communication.

8. The UE of claim 1, wherein resources for transmission of the PUCCH communication are configured on a plurality of sub-bands, and wherein a particular sub-band, of the plurality of sub-bands, on which the PUCCH communication is conveyed corresponds to an interference level of the plurality of sub-bands.

9. The UE of claim 1, wherein the CSI-RS communication is received on a first sub-band, of a plurality of sub-bands, and
further comprise:
switch, based at least in part on transmitting the PUCCH communication, from the first sub-band to a second sub-band; and
wherein transmitting the PUCCH communication
transmit, using the second sub-band, the PUCCH communication.

10. The UE of claim 1, wherein the interference measurement is a channel state information (CSI) interference measurement.

11. The UE of claim 1, wherein the PUCCH communication is a PUCCH format A or a PUCCH format B, and
wherein a PUCCH format of the PUCCH communication is based at least in part on a content of the PUCCH communication.

12. The UE of claim 1, wherein the interference measurement is a signal to interference and noise ratio measurement on a per-sub-band basis.

13. A base station (BS) for wireless communication, comprising:
a memory; and
one or more processors, coupled to the memory, configured to:
transmit, to a user equipment (UE), a channel state information reference signal (CSI-RS) communication;
receive, from the UE, a physical uplink control channel (PUCCH) communication including feedback information that is a response to the CSI-RS communication and including an interference measurement, wherein the PUCCH communication includes an indication of a second sub-band and wherein the CSI-RS communication is transmitted and the PUCCH communication is received on a first sub-band of a plurality of sub-bands; and
receive, using the second sub-band of the plurality of sub-bands, one or more sounding reference signal communications from the UE.

14. The BS of claim 13, wherein the interference measurement is based at least in part on at least one of the CSI-RS communication or an interference measurement resource.

15. The BS of claim 13, wherein the one or more processors are further configured to:
transmit, based at least in part on the interference measurement, information identifying a change to a semi-persistent scheduling occasion or a re-transmission sub-band.

16. The BS of claim 13, wherein the feedback information is a hybrid automatic repeat request feedback message.

17. The BS of claim 13, wherein the one or more processors are further configured to:
transmit for a physical downlink shared channel (PDSCH) transmission in a particular sub-band; and
wherein the one or more processors, to receive the PUCCH communication, are configured to:
receive the PUCCH communication in the particular sub-band.

18. The BS of claim 13, wherein the one or more processors are further configured to:
identify, based at least in part on a PUCCH sequence of the PUCCH communication, an interference level of a sub-band on which the CSI-RS communication is transmitted.

19. The BS of claim 13, wherein the interference measurement is included in information of a payload of the PUCCH communication.

20. The BS of claim 13, wherein the one or more processors are further configured to:
determine an interference level of a first sub-band, of a plurality of sub-bands, on which the CSI-RS is transmitted based at least in part on a second sub-band, of the plurality of sub-bands, on which the PUCCH communication is received.

21. The BS of claim 13, wherein the CSI-RS communication is transmitted on a first sub-band, of a plurality of sub-bands, and
wherein the one or more processors, to receive the PUCCH communication, are configured to:
receive, using a second sub-band of the plurality of sub-bands, the PUCCH communication.

22. The BS of claim 13, wherein the interference measurement is a channel state information (CSI) interference measurement.

23. The BS of claim 13, wherein the PUCCH communication is a PUCCH format A or a PUCCH format B, and
wherein a PUCCH format of the PUCCH communication is based at least in part on a content of the PUCCH communication.

24. The BS of claim 13, wherein the interference measurement is a signal to interference and noise ratio measurement on a per-sub-band basis.

25. A method of wireless communication performed by a user equipment (UE), comprising:
- receiving, from a base station (BS), a channel state information reference signal (CSI-RS) communication;
- transmitting, to the BS, a physical uplink control channel (PUCCH) communication including feedback information that is a response to the CSI-RS communication and including an interference measurement, wherein the PUCCH communication includes an indication of a second sub-band and wherein the CSI-RS communication is received and the PUCCH communication is transmitted on a first sub-band, of a plurality of sub-bands;
- switching, based at least in part on transmitting the PUCCH communication, from the first sub-band to the second sub-band; and
- transmitting, using the second sub-band, one or more sounding reference signal communications.

26. A method of wireless communication performed by a base station (BS), comprising:
- transmitting, to a user equipment (UE), a channel state information reference signal (CSI-RS) communication;
- receiving, from the UE, a physical uplink control channel (PUCCH) communication including feedback information that is a response to the CSI-RS communication and including an interference measurement, wherein the PUCCH communication includes an indication of a second sub-band; and wherein the CSI-RS communication is transmitted and the PUCCH communication is received on a first sub-band, of a plurality of sub-bands; and
- receiving, using a second sub-band of the plurality of sub-bands, one or more sounding reference signal communications from the UE.

* * * * *